Nov. 1, 1966   A. R. WIRKKALA   3,282,440
RIGGING SLINGER EMBODYING AN EXTENDABLE AND
RETRACTABLE LAZY TONG BOOM
Filed Aug. 18, 1965   2 Sheets-Sheet 2

ALBERT R. WIRKKALA
INVENTOR.

BY *Seed & Berry*

ATTORNEYS

United States Patent Office 3,282,440
Patented Nov. 1, 1966

3,282,440
RIGGING SLINGER EMBODYING AN EXTENDABLE AND RETRACTABLE LAZY TONG BOOM
Albert R. Wirkkala, Naselle, Wash.
Filed Aug. 18, 1965, Ser. No. 480,694
6 Claims. (Cl. 212—7)

This invention relates to improvements in that kind of apparatus for skidding of logs generally referred to by workmen operating in the woods as "rigging slingers." In the present instance, that designation applies to certain mobile power equipment used on or in conjunction with a logging tractor or the like involving the use of a boom for drawing out a line or cable from a powered drum on the tractor, together with whatever log attaching equipment, such as choker lines and hooks, grapples and tongs, which may be used therewith.

More particularly the present invention relates to the manner of mounting and use of an extendable boom that is operable outwardly from and laterally to either side and at various upward and downward angular directions from the vehicle, thus to extend the log attaching rigging to more readily reach the log or logs to be handled.

It is also an object of this invention to mount an extendable and retractable boom of a lazy tong type on a logging vehicle. The boom may be mounted on a logging arch or on the frame of the vehicle for convenient and effective control by the operator.

It is also an object of this invention to provide a boom in the form of an extendable and retractable lazy tong mechanism that is operable to and from extendable positions and in various directions by a deft arrangement of selectively operable power cylinders associated therewith.

Further objects and advantages of the invention reside in the details of construction and combination of parts embodied therein as will hereinafter be described.

In accomplishing the above mentioned and other objects of the invention, I have provided the improved details of construction and combination of parts, the preferred forms of which are illustrated in the accompanying drawings, wherein.

Figure 1:
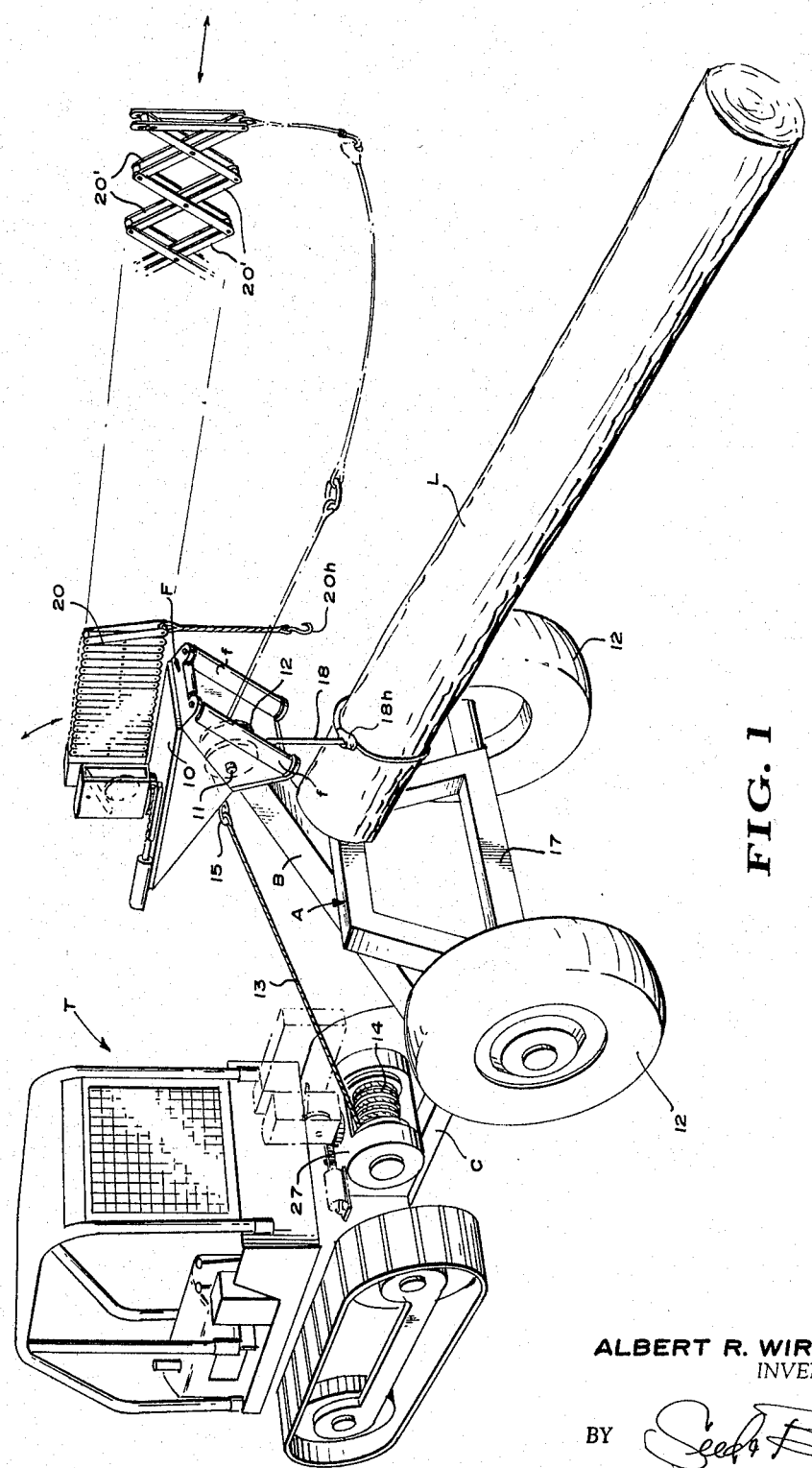
FIG. 1 is a perspective view of an articulately joined logging tractor and arch on which the present extendable boom and rigging have been assembled for use.
Figure 2:
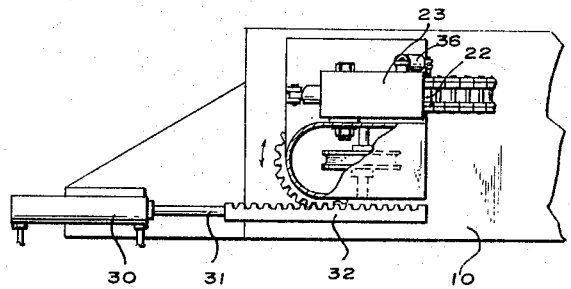
FIG. 2 is a plan or top view of the mounting end portion of the extendable boom showing one of its operating power cylinders.

Referring more in detail to the drawings:

In FIG. 1, I have illustrated a typical present day type of crawler tractor, designated in its entirety by reference character T. The tractor is combined with a common form of two-wheeled logging arch A attached to the tractor at its rear end through an articulated draft connection C. A short, upwardly and rearwardly directed boom B is supported on the arch and boom, at its outer end mounts a platform structure 10. Secured to the boom below the platform are the guiding rollers $f$ of a roller fairleader F.

Positioned in the boom B forwardly of the fairleader F is a horizontal shaft 11 which rotatably mounts a cable guiding sheave 12 over which a logging cable 13 passes as it is wound onto and extended from a powered cable winding drum 14 mounted on the tractor.

The cable is shown to be equipped with a ring 15 or the like at its free end and a plurality of choker lines 18 are releasably attached to the ring. Each choker line is equipped at its end with a suitable choker hook or the like 18$h$ whereby the line may be secured in its application about a log L in the manner shown. When the line 18 is secured to a log, it is drawn toward the arch and the forward end is raised as shown in FIG. 1. This is accomplished by winding in of the cable 13 onto drum 14. The log is then dragged or skidded to a landing or place of disposition.

Figure 3:
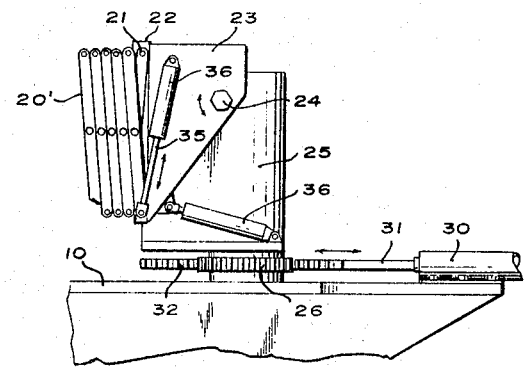
FIG. 3 is a side view of the mounting end portion of the extendable boom as seen from the top side of the views shown in FIG. 2.
Figure 4:
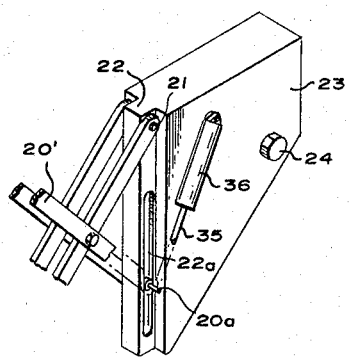
FIG. 4 is an enlarged perspective view of boom mounting frame and illustrating the means of securing the boom thereto.

Mounted on the platform structure 10 is the extendable and retractable lazy tong boom of this invention. The boom comprises a succession of pivotally joined pairs of crossed links 20' as best shown in the extended section of the boom in FIG. 1. At the inner end of the boom, the upper end of the innermost crossed and pivotally joined links are pivotally fixed, as at 21 in FIG. 3, to a fixed block 22 which is formed as a part of a mounting frame 23. The vertical housing is mounted on a horizontal gear wheel 26, and the gear wheel in turn is rotatably supported on the platform 10.

Also mounted on the platform is a power cylinder 30 with a piston rod 31 extended therefrom. The outer end portion of the piston rod is formed as a rack bar 32 which meshes with gear wheel 26. By extending or retracting the piston rod and rack 32, the gear 26 is rotated to swing the boom 20 to one side or the other accordingly. The lower ends of the innermost paired links of the lazy tong boom are pivotally joined to the end of a piston rod 35 that extends downwardly from a power cylinder 36 that is pivotally mounted on the frame member 23. The lower ends of the links are interconnected by a rod 20$a$ and the rod extends through a slot 22$a$ in the block 22. This in turn draws the vertically spaced ends of the other links closer together and thereby the outer end of the lazy tong is extended. When the piston rod is extended, the tong is retracted accordingly. Thus, by a controlled application of pressure medium to the power cylinder 36, the tongs may be extended or retracted. By use of cylinder 30, the boom 20 may be swung or directed to one side or the other.

If it should be desirable or necessary to mount the boom 20 on the tractor at the location in which it is shown in dash lines in FIG. 1, the boom mounting gear 26 is transferred to the top plate of the carrying frame structure 27 above the winch drum 14. In this location, the rack bar 26 and the power cylinder 30 extends transversely of the tractor in operating mesh with the gear 26 as shown in dash lines. In this designation of the boom 20, the arch A is detached from the tractor as not being required. However, by use of the power cylinder 30, the lazy tong boom 20 can be swung to either side and can be extended or retracted by use of the power cylinder 36 in the same manner as before described. Also, the boom may be extended upwardly to various angular degrees as required for the log skidding operations.

Figure 5:
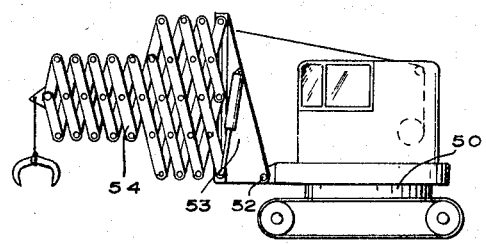
FIG. 5 is a side view of a mobile turntable and a means thereon for mounting the lazy tong equipment as a log lifting and loading device.

In FIG. 5, I have illustrated an adaptation of the present lazy tong boom to load lifting and handling operations. In this view, the vehicle 50 embodies a turntable 51 on a crawler base. Mounted at one end of the turntable for pivotal action on a horizontal transversely directed pivot 52 is a boom mounting frame 53. A lazy tong type of extendable and retractable boom 54 is in turn secured to the mounting frame as previously described.

While I have shown in FIG. 1, the cable 13 as being equipped with a single choker line 18 and choker hook 18$h$, it is the intent that several of these lines 18 might be applied to ring 15 and extended over the sheave wheel 12 for the drawing in of a like number of logs. It is also anticipated that for the outdrawing of the log pickup equipment a hook 20h or the like will be attached to the outer end of the lazy tong boom. It is also anticipated that the usual grapple, tongs or the like might be applied to the outer end of cable 13 and used in the usual manner for log pickup and hauling in.

Referring particularly to the device of FIG. 5, it is to be there shown that the present type of lazy tong boom 54 is applied in a manner substantially like the showing of FIG. 1, to a turntable mounted on a crawler type tractor or the like, and may be equipped at its outer ends with tongs or grapple for log pickup and loading. In this device, the extending and retracting of the boom is by means of a power cylinder 36 as previously described, and the boom may be equipped with a retracting device, for the pulling in of objects to the tractor.

What I claim as new is:

1. A log moving vehicle comprising, in combination, a traction vehicle, a mobile logging arch having an articulated draft connection with said traction vehicle, a forward cable winding drum mounted on said traction vehicle, a platform mounted by and above the arch, an extendable and retractable boom mounted on said platform, said boom being of lazy-tong construction embodying a succession of pivotally joined crossed links disposed for opening and closing to extend or retract the boom, a fairlead mounted on said arch below said platform, a haul-in cable wound on said drum and extendable therefrom over said fairleader, log pickup means attached to the extendable end of the haulin cable and operable over said fairleader for the drawing in of the logs thereby to said arch by said cable winding drum to said arch for their moving by said vehicle; said boom having means at its extendable end for its attachment to said log pickup means, and powered means for extending the boom to draw out said cable, and log pickup means beyond the fairleader and arch for their attachment to logs to be drawn in by the cable and moved by the vehicle.

2. A log moving vehicle comprising, incombination, a traction vehicle, a mobile logging arch having an articulated draft connection with said traction vehicle, a forward cable winding drum mounted on said traction vehicle, a platform mounted by and above the arch, and extendable and retractable boom mounted on said platform, a fairlead mounted on said arch below said platform, and a retractable boom being mounted pivotally on said platform for controlled horizontal swinging adjustment about a pivot axis from side to side and means for controlled vertical adjustment at its extendable end, a haulin cable wound on said drum and extendable therefrom over said fairleader, a log pickup means attached to the extendable end of the haulin cable and operable over said fairleader for the drawing in of the logs thereby to said arch by said cable winding drum to said arch for moving by said vehicle; said boom having means at its extendable end for its attachment to said log pickup means, and powered means for extending the boom to draw out said cable, and log pickup means beyond the fairleader and arch for their attachment to logs to be drawn in by the cable and moved by the vehicle.

3. A combination according to claim 2 wherein said boom is of lazy-tong construction embodying a succession of pivotally joined crossed links disposed for opening and closing a vertical plane for extension or retraction of the boom.

4. A combination according to claim 3 wherein the inner end of the lazy-tong boom is mounted on said platform for the horizontal swinging of said boom laterally to opposite sides of the arch, and wherein the inner ends of the upwardly directed inner set of links are pivotally fixed and the downwardly extended ends of the inner set of links are vertically guided in effecting upward or downward adjustment of the extendable end of said boom.

5. A combination according to claim 4 wherein the lazy tong boom is mounted at its inner end by a housing mounted on the platform for pivoting about a vertical axis, and a power cylinder having a geared connection with the vertical shaft is mounted on said platform for effecting swinging adjustment of the boom.

6. In combination, a traction vehicle with a cable winding drum mounted on and powered by said vehicle, a boom mounting housing on said tractor and a extendable and retractable boom mounted by and extended rearwardly from said housing and tractor, said boom being of lazy-tong construction embodying a succession of pivotally joined crossed links disposed for opening and closing to extend or retract the boom, a fairleader mounted in said housing, a logging cable wound on and extended from the drum over said fairleader and along the boom for log pickup and means at the end of said boom for making a handout connection with the indrawn logging cable.

References Cited by the Examiner

UNITED STATES PATENTS

| 2,927,705 | 3/1960 | Girardi. | |
| 3,043,442 | 7/1962 | Wirkkala | 212—7 |

FOREIGN PATENTS 1,020,454  12/1957  Germany.

ANDRES H. NIELSEN, *Primary Examiner.*

EVON C. BLUNK, *Examiner.*

A. L. LEVINE, *Assistant Examiner.*